Jan. 25, 1938.  N. A. TORNBLOM  2,106,444
EXPLOSIONPROOF UNION
Filed March 23, 1936
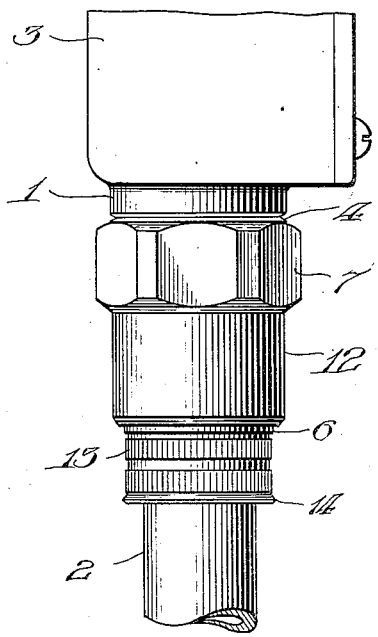
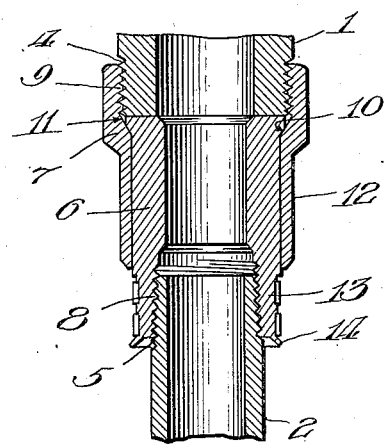
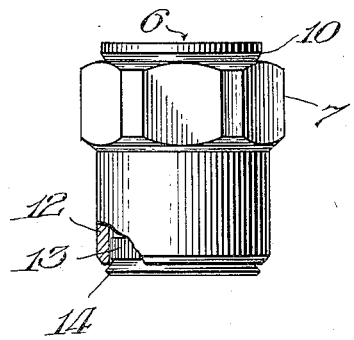
Inventor:
Nils A. Tornblom,
by Wm. F. Freudenreich, atty.

Patented Jan. 25, 1938

2,106,444

UNITED STATES PATENT OFFICE 2,106,444

EXPLOSIONPROOF UNION

Nils A. Tornblom, Chicago, Ill., assignor to Appleton Electric Company, a corporation of Illinois Application March 23, 1936, Serial No. 70,222

3 Claims. (Cl. 285—120)

It is often necessary to provide an explosionproof connection for a pipe that houses and protects current-carrying conductors. In the case of unions employed for this purpose, reliance has heretofore been had upon flat, annular end faces in contact with each other and of considerable width in the radial direction. When the requirements of the fire underwriters change, so that wider bearing surfaces must be employed, it may be costly to try and change over old equipment and, so far as new equipment is concerned, the manufacturer may be called upon to discard much finished stock and prepare new patterns, tools and the like in order to comply with the new standard.

The present invention has for its object to produce a union in which provision is made within the union itself for extinguishing flame that may at some time seek to escape from within the union, between the members thereof, and to the surrounding atmosphere; whereby reliance need no longer be had upon a leak-proof engagement between an end face of a coupling member and a meeting end face of a part to which the union connects that member, and the aforesaid difficulties and disadvantages are almost wholly avoided.

In carrying out my invention, instead of causing the sleeve nut of the union to function simply as a nut that draws the internal, tubular body of the union firmly against a member upon which the nut is screwed, I increase it in length and cause it to have a good bearing on the body member for a sufficient length of the latter to insure that no flame can pass out through this bearing. In the old types of unions the screw-threaded connections with the parts to be joined had to be made such as to guard against leakage of flames past the screw threads, so that in my improved construction the screw-threaded sections of the union may remain as before. Since I rely upon a reasonably close fit between the cylindrical outer surface of the inner member of the union and the long cylindrical inner surface of the nut to guard against leakage of flame, it is necessary that these surfaces be protected against damage in shipping and handling. I therefore provide the body or sleeve member of the union with external shoulders or flanges at both ends instead of at one end only, so that the nut cannot be slipped off; the sleeve or body member being made long enough so that the end which is to be screwed upon a pipe may project beyond the nut far enough to permit a wrench to be applied thereto, or if the nut be slipped back against the shoulder at this end of the body member, the other end of the body member projects slightly beyond the nut so that a workman may easily fit in place or disconnect a pipe that must be connected at both ends to stationary elements.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is an elevation of a fragment of a connection box having a pipe connected thereto by means of one of my improved unions; Fig. 2 is a longitudinal central section through the part shown in Fig. 1, the body of the box being omitted; and Fig. 3 is an elevation of the union, showing the nut slipped back or retracted as far as it will go, and a fragment of the nut being broken away.

Referring to the drawing, I represents a tubular member adapted to be connected to a pipe 2 or other tubular member aligned with the member I. The part I may be a hub or boss projecting from a box or receptacle 3. Both the member I and the pipe 2 are externally screw-threaded, as indicated at 4 and 5, respectively. The member I has a flat end face, as is customary in cases where it is to engage with the flat end face of the inner member of a union. The members I and 2 are connected together by a device that is like an ordinary union in that it consists of an inner sleeve 6 and a surrounding nut 7; the sleeve 6 having internal screw threads 8 that mesh with the screw threads on the pipe, and the nut having internal screw threads 9 engaged with the screw threads 4 on the part I. Also, the sleeve is shown as having at the end opposite its screw-threaded end an external flange 10 that is engaged by an annular internal shoulder II at the inner end of the screw-threaded section of the nut.

In the ordinary union the nut is only slightly longer than the length of the screw-threaded section and the short added length needed to provide the annular shoulder II. In accordance with my invention, however, both the sleeve and the nut are of much greater length than heretofore, the nut having a long smooth-bore tubular part or skirt 12 that fits closely about a long, smooth cylindrical section of the sleeve or body member. The shorter the bearing between the sleeve and the nut, the closer must be the fit.

Therefore, by making this bearing quite long, there may be sufficient tolerance permitted to avoid excessive costs in manufacturing the device without sacrifice of effectiveness of the joint between the two members of the union. The sleeve or body member has a wrench-receiving part 13 beyond the end of the cylindrical bearing section; this being at the screw-threaded end of the sleeve. Beyond the wrench-receiving part 13 is an external flange or shoulder 14 that prevents the nut from being slipped off at this end of the sleeve.

When the nut is moved along the sleeve until arrested by the flange 10, as shown in Fig. 2, obviously no part of the effective cylindrical bearing surface thereon is exposed. Also, when the nut is slipped along the sleeve to the flange 14, only the flanges on the sleeve project beyond the nut, the cylindrical bearing surface, as well as the wrench-receiving section being housed in the nut. Consequently, the cylindrical bearing surface of the sleeve is at all times surrounded and protected by the nut and cannot be damaged through improper application of a wrench thereto or otherwise.

By protecting the surface of the sleeve I do not, however, make it more difficult for a workman to fit in place or detach a pipe to which a union has been attached. Thus, it will be seen that if the nut is unscrewed in Fig. 1 it may drop down relatively to the sleeve to the position illustrated in Fig. 3; thereby exposing the flange 10 and permitting the pipe to be disconnected from the box (if the latter be fixed) by moving it sidewise. Likewise, while making the connection, the flat end of the sleeve is exposed and can be set accurately against the end of the boss or hub 1 before the nut is moved up.

It will thus be seen that since leakage of flame between the sleeve and the nut is prevented by the long cylindrical bearing between these two members, it is not important whether or not the meeting faces between the sleeve and the hub or boss are effective to accomplish the same purpose. For this reason, if, in an old installation, the joint is no longer regarded as safe, or the old types of connections with old boxes or receptacles are no longer considered adequate, it is only necessary to employ one of my improved unions in order to meet the most severe requirements.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. A union composed of a sleeve and a nut surrounding the same, the nut having at one end an enlarged screw-threaded bore and an internal shoulder inwardly from said bore, the sleeve having at the corresponding end an external shoulder adapted to be engaged by the said internal shoulder in the nut and at the other end an external shoulder adapted to engage the corresponding end of the nut when the latter is retracted and thus prevent the nut from being slipped off either end of the sleeve, the sleeve and the nut having long cylindrical bearing surfaces fitting closely together while permitting relative rotary and sliding movements.

2. A union composed of a sleeve and a nut surrounding the same, the nut having at one end an enlarged screw-threaded bore and an internal shoulder inwardly from said bore, the sleeve having at the corresponding end an external shoulder adapted to be engaged by the said internal shoulder in the nut and at the other end an external shoulder adapted to engage the corresponding end of the nut when the latter is retracted and thus prevent the nut from being slipped off either end of the sleeve, the sleeve and the nut having long cylindrical bearing surface fitting closely together while permitting relative rotary and sliding movements, and the distance between the shoulders on the sleeve being such that when the nut is brought to a stop by the first mentioned shoulder a sufficient length of sleeve to take a wrench is left exposed at the other end of the sleeve.

3. A union composed of two long sleeves fitting slidably and rotatably upon and in close contact with each other throughout large portions of their respective lengths, the outer sleeve having at one end an enlarged screw-threaded bore and the inner sleeve having external shoulders at both ends, one of said shoulders being adapted to act as a stop for the outer sleeve when it is moved lengthwise in one direction and the other being adapted to engage with the internal shoulder at the inner end of the enlarged part of the bore in the outer sleeve.

NILS A. TORNBLOM.